(12) United States Patent
Lechner et al.

(10) Patent No.: US 10,989,572 B2
(45) Date of Patent: Apr. 27, 2021

(54) APPARATUS AND METHOD FOR CHECKING THE PLAUSIBILITY OF AN EXCITATION SIGNAL FOR A ROTARY ENCODER

(71) Applicant: Robert Bosch GmbH, Stuttgart (DE)

(72) Inventors: Benjamin Lechner, Neuhausen (DE); Daniel Raichle, Vaihingen (DE); Daniel Zirkel, Wiernsheim-Serres (DE); Michael Ungermann, Darmstadt (DE)

(73) Assignee: Robert Bosch GmbH, Stuttgart (DE)

( * ) Notice: Subject to any disclaimer, the term of this patent is extended or adjusted under 35 U.S.C. 154(b) by 437 days.

(21) Appl. No.: 15/736,357

(22) PCT Filed: Jun. 13, 2016

(86) PCT No.: PCT/EP2016/063516
§ 371 (c)(1),
(2) Date: Dec. 14, 2017

(87) PCT Pub. No.: WO2016/202745
PCT Pub. Date: Dec. 22, 2016

(65) Prior Publication Data
US 2018/0172487 A1 Jun. 21, 2018

(30) Foreign Application Priority Data
Jun. 18, 2015 (DE) .................... 10 2015 211 263.2

(51) Int. Cl.
*G01D 18/00* (2006.01)
*G01D 5/20* (2006.01)

(52) U.S. Cl.
CPC .............. *G01D 18/00* (2013.01); *G01D 5/20* (2013.01)

(58) Field of Classification Search
CPC ................................ G01D 18/00; G01D 5/20
See application file for complete search history.

(56) References Cited

U.S. PATENT DOCUMENTS

| 2009/0243596 A1* | 10/2009 | Izak ..................... G01D 5/2053 324/207.16 |
| 2014/0142782 A1 | 5/2014 | Fu et al. |
| 2014/0148948 A1* | 5/2014 | Hagenauer .......... G01D 5/2073 700/245 |

FOREIGN PATENT DOCUMENTS

| DE | 69823675 | 4/2005 |
| DE | 102011006131 | 9/2011 |

(Continued)

OTHER PUBLICATIONS

International Search Report for Application No. PCT/EP2016/063516 dated Sep. 1, 2016 (English Translation, 3 pages).

*Primary Examiner* — Mischita L Henson
(74) *Attorney, Agent, or Firm* — Michael Best & Friedrich LLP

(57) ABSTRACT

The present invention provides an apparatus and a method for checking the plausibility of an excitation signal. The apparatus is designed with: an input signal device (12) which is designed to provide an input signal (52) on the basis of the excitation signal (51), the plausibility of which is to be checked; an amplitude estimation device (14) which is designed to determine an estimated amplitude value (53) for an amplitude of the excitation signal (51) on the basis of the input signal (52) provided; a phase angle estimation device (16) which is designed to determine an estimated phase angle value (54) for a phase angle of the excitation signal (51) on the basis of the input signal (52) provided; a diagnostic device (18) which is designed to generate a diagnostic signal (55) on the basis of at least the determined estimated amplitude value (53) and the determined estimated phase angle value (54); and a plausibility-checking device (20) which is designed to check the plausibility of the excitation signal (51) on the basis of the diagnostic signal (Continued)

(55) depending on a predetermined range of values for the diagnostic signal (55).

10 Claims, 2 Drawing Sheets

(56) References Cited

FOREIGN PATENT DOCUMENTS

| | | | |
|---|---|---|---|
| DE | 102011078583 | 1/2013 | |
| EP | 0921387 | 6/1999 | |
| EP | 0921387 A2 * | 6/1999 | ............ G01M 17/04 |
| EP | 2063597 | 5/2009 | |

* cited by examiner

APPARATUS AND METHOD FOR CHECKING THE PLAUSIBILITY OF AN EXCITATION SIGNAL FOR A ROTARY ENCODER

BACKGROUND OF THE INVENTION

The present invention relates to an apparatus and a method for checking the plausibility of an excitation signal for a rotary encoder. In particular, the present invention relates to an apparatus and a method for checking the plausibility of an excitation signal for a resolver.

Electric and hybrid vehicles are becoming increasingly important. In order to control permanent-magnet synchronous machines (PSM) and electrically excited synchronous machines (ESM) as are used in vehicles of this kind, it is necessary to know the rotor position angle of machines of said kind. Furthermore, it is necessary to know the electrical frequency of the drive in order to control asynchronous machines (ASM). Various kinds of sensor can be used in order to ascertain the rotor position angle or the electrical frequency. For example, sensors based on the eddy current effect, resolvers or digital angle encoder signals are possible.

In this case, a resolver is excited, for example, with a sinusoidal excitation signal. Distorted, amplitude-modulated voltages, from the envelope of which the information about the rotor position can be obtained, are generally received as receiver signals of the resolver in this case. Excitation signals with an amplitude of ten volts and a frequency of the sinusoidal function of ten kilohertz are typically used.

German patent application DE 10 2011 078 583 A1 discloses, for example, evaluation of resolver sensor signals in a vehicle. To this end, a resolver picks up a rotary movement of a rotor, and a processor element processes the sinusoidal or cosinusoidal output signals of the resolver. The excitation signal is supplied to the resolver by means of a power electronics system. If there are deviations between the excitation signal actually supplied (actual excitation signal) and an excitation signal to be supplied (desired excitation signal), this can lead to errors when ascertaining the rotor position angle using the resolver.

Therefore, a method and an apparatus for checking the plausibility of an excitation signal for a rotary encoder, in particular a resolver, are required.

SUMMARY OF THE INVENTION

The present invention provides an apparatus and a method.

The invention accordingly provides an apparatus, comprising: an input signal supply device which is designed to supply an input signal based on the excitation signal of which the plausibility is to be checked; an amplitude estimation device which is designed to determine an estimated amplitude value for an amplitude of the excitation signal based on the supplied input signal; a phase angle estimation device which is designed to determine an estimated phase angle value for a phase angle of the excitation signal based on the supplied input signal; a diagnosis device which is designed to generate a diagnosis signal based at least on the determined estimated amplitude value and the determined estimated phase angle value; and a plausibility-checking device which is designed to check the plausibility of the excitation signal based on the diagnosis signal depending on a predetermined value range for the diagnosis signal.

The rotary encoder can be designed, in particular, to determine a rotor position angle of a synchronous machine.

Checking the plausibility of the excitation signal is intended to be understood to mean, in particular, classifying a value of the excitation signal as plausible, that is to say as sufficiently credible, acceptable and/or sufficiently accurate. For example, it can be provided that only those receiver signals of the resolver which have been generated by an excitation signal which is classified as plausible are taken into account for determining the rotor position angle. Checking the plausibility can comprise outputting a signal which indicates the plausibility of the ascertained signal.

The invention further provides a method comprising the steps of: supplying an input signal based on the excitation signal of which the plausibility is to be checked; determining an estimated amplitude value for an amplitude of the excitation signal based on the supplied input signal; determining an estimated phase angle value for a phase angle of the excitation signal based on the supplied input signal; generating a diagnosis signal based at least on the determined estimated amplitude value and the determined estimated phase angle value; and checking the plausibility of the excitation signal based on the diagnosis signal depending on a predetermined value range for the diagnosis signal.

Supplying the input signal can comprise, in particular, receiving an analog or digital excitation signal or sampling an analog excitation signal for generating a digital input signal.

The method can be carried out, in particular, continuously, for example once per period of the excitation signal or of the input signal.

The invention allows the plausibility of an excitation signal for a rotary encoder to be checked in a technically particularly simple manner. The excitation signal can have, for example, an amplitude of between five and fifteen, in particular between eight and twelve, particularly preferably of ten, volts. As a result of checking the plausibility of the excitation signal, receiver signals of the resolver which are based on implausible excitation signals can be disregarded when determining the rotation angle. This increases the reliability, precision and accuracy of a rotation angle determination operation. If accurate determination of the angle is not possible, an equivalent reaction, for example switching off the drive, can be initiated.

The determined estimated amplitude value can advantageously be used for checking the plausibility of an amplitude of the excitation signal. It can be provided that the excitation signal is classified as plausible only when at least the amplitude of the excitation signal has been classified as plausible.

Advantageous embodiments and developments can be found in the dependent claims and also in the description with reference to the figures.

According to an advantageous development, the phase angle estimation device is designed to carry out the determination of the estimated phase angle value further based on an expected period duration of the excitation signal, that is to say a setpoint value for the period duration of the excitation signal, or on a period duration of the input signal. Therefore, the estimated phase angle value is more accurate, that is to say closer to the actual phase angle.

According to a further advantageous development, the phase angle estimation device is designed to ascertain a zero crossing of the input signal and to carry out the determination of the estimated phase angle value further based on the ascertained zero crossing of the input signal. Therefore, the estimated phase angle value is more accurate.

According to a further advantageous development, the excitation signal—and therefore also the input signal—is a sinusoidal or cosinusoidal signal. The diagnosis device can have a computer unit which is designed to generate, as auxiliary signal, a signal, which is phase-shifted through ninety degrees in relation to the input signal but is otherwise identical to the input signal, using the determined estimated amplitude value and the determined estimated phase angle value. If the excitation signal is, for example, a sinusoidal signal, the computer unit can be designed to generate, as an auxiliary signal, a cosinusoidal signal with the same frequency and amplitude. If the excitation signal is, for example, a cosinusoidal signal, the computer unit can be designed to generate, as auxiliary signal, a sinusoidal signal. The diagnosis device can be designed to generate the diagnosis signal based on a square of the input signal and also on a square of the generated auxiliary signal, for example of the generated cosinusoidal signal, or alternatively of the generated sinusoidal signal. Therefore, a meaningful diagnosis signal can be generated with a low level of technical expenditure.

According to a further advantageous development, the diagnosis device is designed to generate the diagnosis signal based on a sum of the square of the input signal and of the square of the generated auxiliary signal, for example of the generated cosinusoidal or sinusoidal signal. Therefore, a meaningful diagnosis signal can be generated with a low level of technical expenditure.

According to an advantageous development of the method according to the invention, the determination of the estimated phase angle value is further based on an expected period of the excitation signal. According to a further advantageous development, the determination of the estimated phase angle value comprises ascertaining a zero crossing of the input signal. The determination of the estimated phase angle value can be based on the ascertained zero crossing of the input signal.

BRIEF DESCRIPTION OF THE DRAWINGS

The present invention will be explained in greater detail below with reference to the exemplary embodiments illustrated in the schematic figures of the drawings, in which.

Unless stated otherwise, elements and devices that are the same or functionally the same are provided with the same reference symbols throughout the figures. The numbering of method steps serves for clarity and, in particular, unless stated otherwise, is not intended to imply a specific time sequence. In particular, a number of method steps may also be carried out simultaneously.

DETAILED DESCRIPTION

Figure 1:
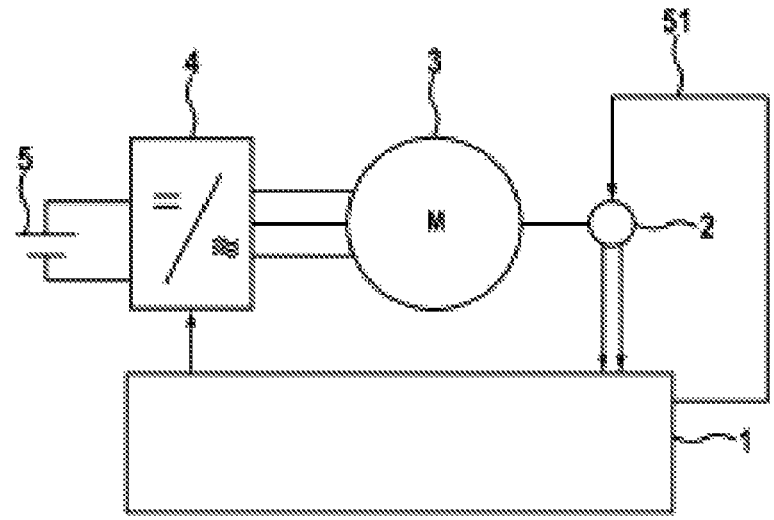
FIG. 1 shows a schematic block diagram of an electrical drive system according to one embodiment of the present invention.

FIG. 1 shows a schematic block diagram of an electrical drive system according to one embodiment. An electrical machine 3 is fed from an electrical energy source 5 by means of a converter 4. The electrical energy source 5 may be, for example, a traction battery of an electric vehicle. The electrical machine 3 may be, for example, a permanent-magnet synchronous machine, an electrically excited synchronous machine or else an asynchronous machine. Furthermore, other electrical machines are also possible in principle. The embodiment, illustrated here, of a three-phase electrical machine 3 represents only one exemplary embodiment. Furthermore, electrical machines with a number of phases which differs from three are also possible. The converter 4 converts the electrical energy which is provided by the electrical energy source 5 and supplies the converted electrical energy for the purpose of driving the electrical machine 3. In this case, the electrical machine 3 can be driven based on prespecifications or control signals from a control apparatus 1. Furthermore, during braking of the electrical machine 3, kinetic energy can also be converted into electrical energy by the electrical machine 3 and this electrical energy can be fed into an electrical energy store of the energy source 5 by means of the converter 4.

In order to control a permanent-magnet or electrically excited synchronous machine, it is necessary to know the position of the rotor in said machine. Furthermore, it is necessary to know the electrical frequency of a machine of this kind in order to control asynchronous machines. To this end, the electrical machine 3 can be coupled to a rotary encoder 2. For example, the rotary encoder 2 can be coupled to the drive shaft of the electrical machine 3. For example, sensors based on the eddy current effect, digital angle encoder signals or so-called resolvers are possible for determining the rotor position and/or the electrical frequency of the machine 3.

In a resolver, two stator windings which are electrically offset through 90° and surround a rotor which is mounted in the housing and has a rotor winding are generally arranged in a housing. Various alternatives for ascertaining the angular position are possible in principle, one option from amongst said alternatives being described below by way of example. For example, the rotor winding can be excited by an excitation signal 51 in the form of a sinusoidal AC voltage. In this case, the amplitudes of the voltages which are induced in the two stator windings are dependent on the angular position of the rotor and correspond to the sine of the angular position of the rotor and to the cosine of the angular position of the rotor. Therefore, the angular position of the rotor can be calculated from the arctan of the enveloping signals of the two stator windings.

The angular position of the rotor and, respectively, the electrical frequency are ascertained in the control apparatus 1 in this case. The control apparatus 1 comprises an apparatus 10 according to the invention for checking the plausibility of the excitation signal 51 for the rotary encoder 2, as will be explained in greater detail below with reference to FIG. 2.

Figure 2:
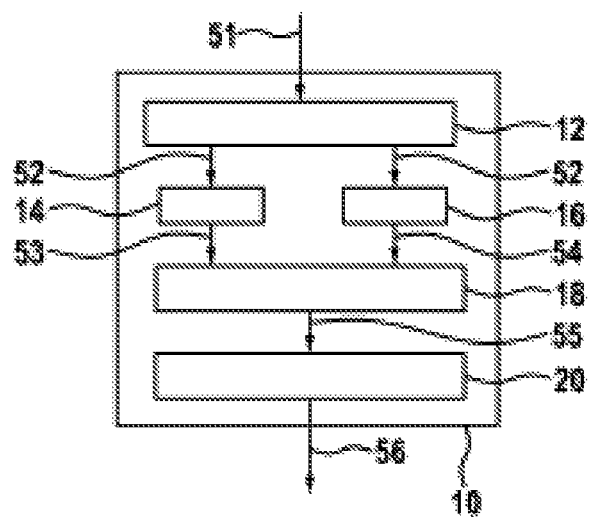
FIG. 2 is a schematic illustration of an apparatus for checking the plausibility of an excitation signal for a rotary encoder according to a further embodiment of the present invention.

FIG. 2 is a schematic illustration of an apparatus 10 for checking the plausibility of an excitation signal 51 for the rotary encoder 2. The apparatus 10 can be realized using hardware or using software or by a combination of hardware and software.

The apparatus 10 comprises an input signal device 12 which is designed to supply an input signal 52 based on the excitation signal 51. To this end, the excitation signal 51 can be applied to the input signal device 12 or tapped off from the input signal device 12.

The excitation signal 51 has, for example, the form $$U_{Exc}(t) = U_{ExcAmp} \sin(2\pi f_{Exc} t + \gamma),$$

where $U_{ExcAmp}$ denotes an amplitude, $f_{Exc}$ denotes a frequency, and γ denotes a phase angle of the excitation signal 51.

The input signal device 12 can comprise a hardware-based or software-based filter unit which is designed to filter the excitation signal 51. The input signal device 21 can furthermore comprise an analog/digital converter unit which is designed to sample the filtered excitation signal at times $t_k$ in order to generate a sequence $U_{Ein}(t_k) = U_{ExcAmp} \sin(2\pi f_{Exc} t_k + \gamma)$ as input signal 52. A sampling frequency for sampling the excitation signal 51 can advantageously be matched to the desired frequency $f_{Exc}$ of the excitation signal 51, which can also be called the excitation frequency, by the analog/digital converter unit. For example, the sampling frequency can be adapted to a multiple, in particular at least five times, preferably at least ten times, the excitation frequency. At a customary excitation frequency of ten kilohertz, a sampling frequency of one hundred kilohertz can be selected for example. In this case, ten sampling values are detected by the analog/digital converter unit for each period of the excitation signal 51 and the input signal 52 is generated with 10 discrete values per period of the excitation signal 51.

An amplitude estimation device 14 of the apparatus 10 is designed to determine an estimated amplitude value 53 for the amplitude $U_{ExcAmp}$ of the excitation signal 51 based on the generated input signal 52.

For example, the amplitude estimation device 14, or the apparatus 10, can have a maximum determination unit and a minimum determination unit which are designed to ascertain a maximum value and, respectively, a minimum value within a predetermined number N of chronologically preceding sampling values of the input signal 52. The predetermined number N can be fixed, in particular, at a number of sampling values per period of the excitation signal 51, for example at ten, that is to say N=10. The amplitude estimation device 14, or the apparatus 10, can have an amplitude calculation unit which is designed to calculate half the difference between the ascertained maximum value and the ascertained minimum value and output said difference as an estimated amplitude value 53 for the amplitude $U_{ExcAmp}$ of the excitation signal 51.

In other words, an estimated amplitude value 53, which is denoted $\hat{U}_{ExcAmp}(t_k)$, can be determined as $\hat{U}_{ExcAmp}(t_k) = \frac{1}{2}(\max_{n \in [0, \ldots, N-1]} U_{Ein}(t_{k-n}) - \min_{n \in [0, \ldots, N-1]} U_{Ein}(t_{k-n}))$, where the argument $t_k$ of the estimated amplitude value 53 means that the estimated amplitude value 53 is valid at time $t_k$. The estimated amplitude value 53 is preferably determined precisely once per period of the excitation signal 51 or of the input signal 52. As a result, the determination can be implemented in a numerically efficient manner. To this end, an item of information about the period of the excitation signal 51 can be transmitted to the amplitude estimation device 14, for example by the control apparatus 10. However, as an alternative, the estimated amplitude value 53 can also be determined at each sampling time $t_k$. An average value of the N individual estimated amplitude values determined per period can also be determined as estimated amplitude value 53.

The apparatus 10 can comprise an amplitude plausibility checking device which is designed to check the plausibility of an amplitude of the excitation signal 51 based on the determined estimated amplitude value 53, that is to say to classify said amplitude as plausible or acceptable when the determined estimated amplitude value 53 lies within a predetermined amplitude range, in particular below a predetermined amplitude threshold value δ. The predetermined amplitude threshold value g can be determined, in particular, taking into account systematic estimation errors. It is also feasible to use other methods for determining the amplitudes, for example recursive least squares estimators.

The apparatus 10 further comprises a phase angle estimation device 16 which is designed to determine an estimated phase angle value 54 for the phase angle γ of the excitation signal 51 based on the supplied input signal 52.

To this end, the phase angle estimation device 16, or the apparatus 10, have a zero crossing ascertaining unit, by means of which an actual or interpolated zero crossing of the input signal 52 can be ascertained, and a line calculation unit, by means of which a line can be calculated.

To this end, the zero crossing ascertaining unit ascertains a time $t_{BZRE}$ at which the input signal 52 is negative and which is followed, without further sampling times $t_k$ therebetween, by a time $t_{BZRE+1}$ at which the input signal 52 is positive, that is to say a zero crossing with a positive gradient is ascertained. The line calculation unit is used to calculate, based on the ascertained time $t_{BZRE}$, a line of best fit G(t) as $$G(t) = \frac{U_{Ein}(t_{BZRE+1}) - U_{Ein}(t_{BZRE})}{t_{BZRE+1} - t_{BZRE}} t + U_{Ein}(t_{BZRE}).$$

The excitation signal 52 can be linearly approximated to the zero crossing by the line of best fit G(t). As an alternative, the zero crossing ascertaining unit ascertains a time $t_{BZRE}$ at which the input signal 52 is positive and which is followed, without further sampling times $t_k$ therebetween, by a time $t_{BZRE+1}$ at which the input signal 52 is negative, that is to say a zero crossing with a negative gradient is ascertained. A combination of ascertaining zero crossings with a positive gradient and with a negative gradient is also possible.

The phase angle estimation device 16 is further designed to resolve the line of best fit G(t) after a time $t_{ZC}$ of the zero crossing of the excitation signal 51, where the following formula can be used:

$$t_{ZC}(t_k) = -U_{Ein}(t_{BZRE}) \frac{t_{BZRE+1} - t_{BZRE}}{U_{Ein}(t_{BZRE+1}) - U_{Ein}(t_{BZRE})}$$

The argument $t_k$ of $t_{ZC}$ or another function means here, above and below, that the ascertained value, here $t_{ZC}$, is the chronologically last, that is to say most recent, valid value at time $t_k$. Therefore, $t_{ZC}(t_k)$ is the last time, valid at time $t_k$, of the corresponding positive or negative zero crossing according to the definition of $t_{BZRE}$. An expected duration $$T_{Exc} = \frac{1}{f_{Exc}}$$

of a period of the excitation signal 51 can additionally be supplied to the phase angle estimation device 16, for example by the control apparatus 1. The expected duration may be, in particular, the duration of the period of the excitation signal 51, which duration is desired for exciting the resolver 2. The duration of the period can also be calculated by the phase angle estimation device 16 based on an excitation frequency which is transmitted to the phase angle estimation device 16.

The phase angle estimation device 16 is further designed to determine the estimated phase angle value 54 as a fraction of a full period of the excitation signal 51, which fraction is based on a time of the zero crossing of the excitation signal 51.

The estimated phase angle value 54, when it, as is valid at time $t_k$, is denoted $\hat{y}(t_k)$, can be determined by the phase angle estimation device 16 as $$\hat{y}(t_k) = 2\pi \frac{t_{ZC}(t_k)}{T_{Exc}}.$$

The apparatus 10 further comprises a diagnosis device 18 which is designed to generate a diagnosis signal 55 based at least on the determined estimated amplitude value 53 and the determined estimated phase angle value 54.

To this end, the diagnosis device 18 can have a computer unit which is designed to generate a cosinusoidal signal using the determined estimated amplitude value 53 and the determined estimated phase angle value 54. The cosinusoidal signal has the estimated amplitude value 53, which is denoted $\hat{U}_{ExcAmp}$, as amplitude, the excitation frequency $f_{Exc}$ of the excitation signal 51 as frequency, and the estimated phase angle value 54, denoted $\hat{y}(t_k)$, as phase angle. Therefore, the cosinusoidal signal, when it, as is valid at time $t_k$, is denoted $U_{SynCos}y(t_k)$, can be generated as $U_{SynCos}(t_k) = \hat{U}_{ExcAmp}(t_k)\cos(2\pi f_{Exc}t_k + \hat{y}(t_k))$. In a numerically advantageous manner in respect of a storage requirement of the diagnosis device 18, the cosinusoidal signal can be generated, instead of by calling up a cosine function, by adding $\pi/2$ and calling up a sine function which can already be stored in the apparatus 10.

The diagnosis device 18 can generate a diagnosis signal 55 based on the generated cosinusoidal signal and based on the ascertained, sinusoidal input signal 52, in particular as a difference from a quotient of which the dividend is a sum of a square of the cosinusoidal signal and of a square of the sinusoidal input signal 52 and of which the divisor is the square of the estimated amplitude value 53, and generate the value one.

Therefore, the diagnosis signal 55, as is valid at time $t_k$ and is denoted $U_{ClkShp}(t_k)$, can be generated as $$U_{ClkShp}(t_k) = \frac{(U_{SynCos}(t_k))^2 + (U_{Ein}(t_k))^2}{(\hat{U}_{ExcAmp}(t_k))^2} - 1.$$

The diagnosis signal 55 is advantageously precisely zero given a correct, that is to say exact, estimation of the amplitude and of the phase angle, that is to say if $\hat{U}_{ExcAmp} = U_{ExcAmp}$ and if $\hat{y}(t_k) = \gamma$, as can be shown by employment and use of the trigonometric addition theorem $\sin^2 + \cos^2 = 1$.

The apparatus 10 further comprises a plausibility checking device 20 which is designed to check the plausibility of the excitation signal 51, that is to say to classify said excitation signal as correct if the diagnosis signal 55 lies in a predetermined value range. The plausibility checking device 20 can be designed to output a plausibility signal 56 which indicates whether the excitation signal 51 has been classified as plausible at the current time—or a preceding time which is defined relative to the current time—or not. For example, the plausibility signal 56 can be a logic one if the excitation signal 51 has been classified as plausible and can be a logic zero if the excitation signal 51 has not been classified as plausible, that is to say as implausible, by the plausibility checking device 20.

In particular, the plausibility checking device 20 is designed to check the plausibility of the excitation signal 51 at most if a magnitude of a value of the diagnosis signal 55 at a time $t_k$, at which the plausibility of the excitation signal 51 is intended to be checked, lies below a predetermined diagnosis threshold value $\sigma$, that is to say if $|U_{ClkShp}(t_k)| < \sigma$. For example, the plausibility of the excitation signal 51 is checked at time $t_k$ precisely when the magnitude of the value of the diagnosis signal 51 at time $t_k$ is smaller than the diagnosis threshold value $\sigma$, $|U_{ClkShp}(t_k)| < \sigma$, and said plausibility is not checked when the magnitude of the value of the diagnosis signal 51 at time $t_k$ is greater than or equal to the diagnosis threshold value $\sigma$, $|U_{ClkShp}(t_k)| \geq \sigma$.

The plausibility of the excitation signal 51 is preferably checked at time $t_k$ only when both the estimated amplitude value 53 lies within a predetermined range, for example lies below the amplitude threshold value, and simultaneously the magnitude of the value of the diagnosis signal 51 at time $t_k$ is smaller than the diagnosis threshold value $\sigma$.

The diagnosis threshold value $\sigma$ can be defined taking into account systematic estimation errors when determining the estimated phase angle value 54 and the estimated amplitude value 53. A fixed diagnosis threshold value $\sigma$ can be used. As an alternative, a variable diagnosis threshold value $\sigma$, for example a diagnosis threshold value $\sigma$ which is dependent on the estimated amplitude value 53, in particular on the square of the estimated amplitude value 53, can be used.

This is particularly advantageous when, as an alternative to the above-described diagnosis signal 56, an alternative diagnosis signal 56 is generated by the diagnosis device 18 as $$U_{ClkShp}(t_k) = (U_{SynCos}(t_k))^2 (U_{Ein}(t_k))^2 (\hat{U}_{ExcAmp}(t_k))^2$$

which is given by multiplying the above-described diagnosis signal by the square of the estimated amplitude value 53 of the input signal 52. When the alternative diagnosis signal is used, in particular in conjunction with a diagnosis threshold value $\sigma$ which is dependent on the estimated amplitude value 53, division can be saved in a numerically advantageous manner, as a result of which the diagnosis device 18 can be designed to be less complex.

Both the first-described diagnosis signal and also the alternative diagnosis signal are both a measure of a sinusoidal nature of the excitation signal 51 and also a measure of a deviation of an actual frequency of the excitation signal 51 from the desired excitation frequency. Therefore, the apparatus 10 can also be called an apparatus for diagnosing a sinusoidal nature of an excitation signal and an apparatus for diagnosing a frequency deviation of an excitation signal.

Figure 3:
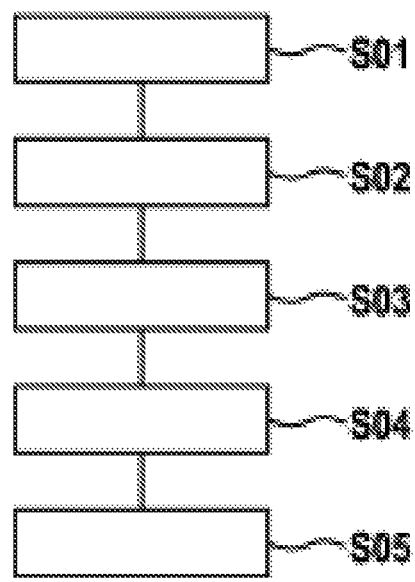
FIG. 3 shows a schematic flowchart for explaining a method for checking the plausibility of an excitation signal for a rotary encoder according to a yet further embodiment of the present invention.

FIG. 3 shows a schematic flow chart for explaining a method for checking the plausibility of an excitation signal for a rotary encoder according to a yet further embodiment of the present invention. The method according to FIG. 3 can be executed, in particular, using an apparatus according to FIG. 2 and can be adapted with regard to all of the variants and developments described in connection with the apparatus according to the invention.

In a step S01, an input signal 52 is supplied based on the excitation signal 51 of which the plausibility is to be checked. In a step S02, an estimated amplitude value 53 for an amplitude of the excitation signal 51 is determined based on the supplied input signal 52. In a step S03, an estimated phase angle value 54 for a phase angle of the excitation signal 51 is determined based on the supplied input signal 52.

In a step S04, a diagnosis signal 55 is generated based at least on the determined estimated amplitude value 53 and the determined estimated phase angle value 54. In a step S05, the plausibility of the excitation signal 51 is checked, that is to say said excitation signal is classified as plausible, if the diagnosis signal 55 lies in a predetermined value range. When the plausibility of the excitation signal 51 is checked, a plausibility signal 56 can optionally be output, said plausibility signal indicating that the excitation signal 51 has been classified as plausible.

Although the present invention has been described above on the basis of preferred exemplary embodiments, it is not limited to said exemplary embodiments, but rather can be modified in various ways. In particular, the invention can be altered or modified in a variety of ways without departing from the essence of the invention.

The invention claimed is:

1. A control apparatus for checking the plausibility of an excitation signal (51) for a resolver, the control apparatus configured to:
   receive the excitation signal (51) from a rotary encoder (2) coupled to the resolver;
   supply an input signal (52) based on the excitation signal (51) of which the plausibility is to be checked;
   determine an estimated amplitude value (53) for an amplitude of the excitation signal (51) based on the supplied input signal (52);
   determine an estimated phase angle value (54) for a phase angle of the excitation signal (51) based on the supplied input signal (52);
   generate a diagnosis signal (55) based at least on the determined estimated amplitude value (53) and the determined estimated phase angle value (54); and
   check the plausibility of the excitation signal (51) based on the diagnosis signal (55) depending on a predetermined value range for the diagnosis signal (55),
   wherein a drive of the resolver is shut off in response to the diagnosis signal (55) failing to fall within the predetermined value range.

2. The control apparatus as claimed in claim 1, wherein the control apparatus is configured to carry out the determination (S03) of the estimated phase angle value (54) further based on an expected period of the excitation signal (51).

3. The control apparatus as claimed in claim 1, wherein the control apparatus is configured to ascertain a zero crossing of the input signal (52) and to carry out the determination (S03) of the estimated phase angle value (54) further based on the ascertained zero crossing of the input signal (52).

4. The control apparatus as claimed in claim 1,
   wherein the excitation signal (51) is a sinusoidal or cosinusoidal signal;
   wherein the control apparatus has a computer unit configured to generate an auxiliary signal, which is phase-shifted through ninety degrees in relation to the input signal (52) and is otherwise identical to the input signal (52), using the determined estimated amplitude value (53) and the determined estimated phase angle value (54); and
   wherein the control apparatus is configured to generate the diagnosis signal (55) based on a square of the input signal (52) and also on a square of the generated auxiliary signal.

5. The control apparatus as claimed in claim 4, wherein the control apparatus is configured to generate the diagnosis signal (55) based on a sum of the square of the input signal (52) and of the square of the generated auxiliary signal.

6. A method for checking the plausibility of an excitation signal (51) for a resolver, comprising the steps of:
   receiving the excitation signal (51) from a rotary encoder (2) coupled to the resolver;
   supplying (S01) an input signal (52) based on the excitation signal (51) of which the plausibility is to be checked;
   determining (S02) an estimated amplitude value (53) for an amplitude of the excitation signal (51) based on the supplied input signal (52);
   determining (S03) an estimated phase angle value (54) for a phase angle of the excitation signal (51) based on the supplied input signal (52);
   generating (S04) a diagnosis signal (55) based at least on the determined estimated amplitude value (53) and the determined estimated phase angle value (54);
   checking the plausibility (S06) of the excitation signal (51) based on the diagnosis signal (55) depending on a predetermined value range for the diagnosis signal (55); and
   shutting off a drive of the resolver in response to the diagnosis signal (55) failing to fall within the predetermined value range.

7. The method as claimed in claim 6, wherein the determination (S03) of the phase angle estimated value (54) is further based on an expected period of the excitation signal (51).

8. The method as claimed in claim 6, wherein the determination (S03) of the estimated phase angle value (54) comprises ascertaining a zero crossing of the input signal (52); and wherein the determination (S03) of the estimated phase angle value (54) is further based on the ascertained zero crossing of the input signal (52).

9. The method as claimed in claim 6, wherein an auxiliary signal, which is phase-shifted through ninety degrees in relation to the input signal (52) and is otherwise identical to the input signal (52), is generated using the determined estimated amplitude value (53) and the determined estimated phase angle value (54); and wherein the diagnosis signal (55) is based on a square of the input signal (52) and also on a square of the generated auxiliary signal.

10. The method as claimed in claim 9, wherein the diagnosis signal (55) is based on a sum of the square of the input signal (52) and of the square of the generated auxiliary signal.

* * * * *